US006161092A

United States Patent [19]

Latshaw et al.

[11] Patent Number: 6,161,092

[45] Date of Patent: Dec. 12, 2000

[54] PRESENTING INFORMATION USING PRESTORED SPEECH

[75] Inventors: Gary L. Latshaw, Cupertino; Monica A. Sardesai, Fremont, both of Calif.

[73] Assignee: Etak, Inc., Menlo Park, Calif.

[21] Appl. No.: 09/163,118

[22] Filed: Sep. 29, 1998

[51] Int. Cl.[7] ............................ G10L 11/00; G06F 19/00; G06G 7/70; G08G 1/09; G08G 1/00

[52] U.S. Cl. .......................... 704/270; 704/258; 704/274; 701/117; 701/118; 340/905

[58] Field of Search .................................... 701/208, 213, 701/117–119, 200–220; 340/905, 995; 364/436–438; 704/231, 260, 246, 254, 255–257, 251

[56] References Cited

U.S. PATENT DOCUMENTS

| | | | |
|---|---|---|---|
| 4,792,803 | 12/1988 | Madnick et al. | 340/905 |
| 5,003,601 | 3/1991 | Watari et al. | 381/43 |
| 5,131,020 | 7/1992 | Liebesny et al. | 340/905 |
| 5,164,904 | 11/1992 | Summer | 701/117 |
| 5,355,432 | 10/1994 | Tanaka et al. | 395/2.43 |
| 5,635,924 | 6/1997 | Tran et al. | 340/905 |
| 5,648,768 | 7/1997 | Bouve | 701/207 |
| 5,736,941 | 4/1998 | Schulte et al. | 340/995 |
| 5,758,319 | 5/1998 | Knittle | 704/251 |
| 5,784,006 | 7/1998 | Hochstein | 340/905 |

OTHER PUBLICATIONS

Deja.com: Power search Results, http://www.deja.com, Jan. 1980–Sep. 1997.

T. Hoffman, "Hertz Steers Customers in Right Direction," Computerworld, Dec. 1994.

Clarion NAX9200 In–Vehicle Navigation System With Etak Digital Map—Operation Manual, Sep. 30, 1996.

Declaration of Lawrence E. Sweeney, Jr., Ph.D. providing more information on the Clarion NAX9200 of Document #1, May 20, 1999.

Etak and Metro Networks, Real–Time Traveler Information Service, 1997.

Etak, Traffic Check, 1998.

*Primary Examiner*—Tãlivaldis I. Šmits
*Assistant Examiner*—Daniel A. Nolan
*Attorney, Agent, or Firm*—Fliesler, Dubb, Meyer & Lovejoy LLP

[57] ABSTRACT

Information (e.g. traffic information) is retrieved from a server. The content of the information is reviewed in order to determine which of a plurality of prestored speech files should be used to report the information. The selected speech files are concatenated to form an audio presentation. The speech files may include phrases identifying incident types, locations, severity and/or timing information, as well as other filler words that improve the audio presentation. In some embodiments, the audio presentation is accompanied by video and/or graphics that can be referenced by the audio presentation.

48 Claims, 9 Drawing Sheets

Figure 9
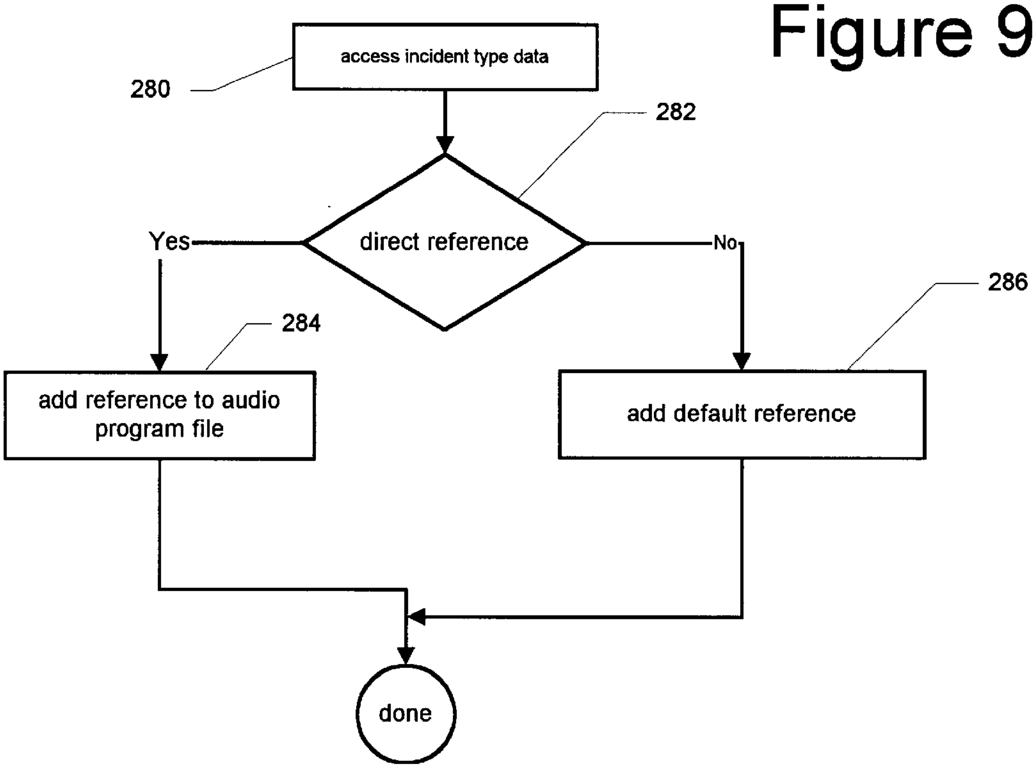
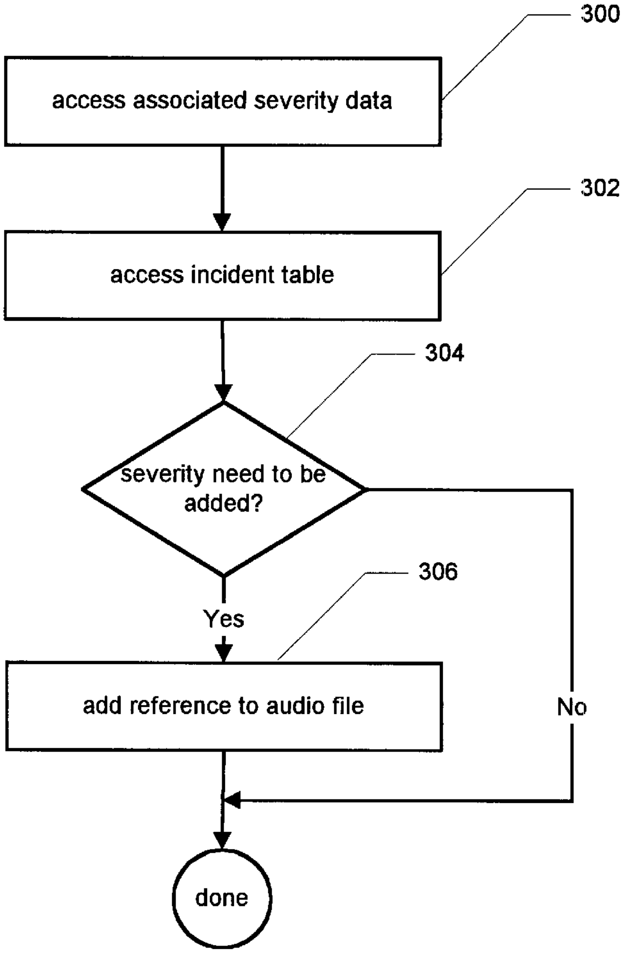
Figure 10

PRESENTING INFORMATION USING PRESTORED SPEECH

BACKGROUND OF THE INVENTION

1. Field of the Invention

The present invention is directed to a system for presenting information using prestored speech.

2. Description of the Related Art

Radio and television traffic advisories have been used for many years to alert drivers to various traffic incidents. One shortcoming of these traffic reports are that they must share air time with other content and, therefore, do not always provide information when needed or do not provide some information at all due to air time constraints. For example, a radio station may broadcast traffic news every half hour; however, a driver may have a need for traffic information at a time between broadcasts. Furthermore, the traffic report provided by traditional television and radio broadcasters utilize a human being to announce the traffic. It would be more efficient and economical to provide traffic information in an automated fashion, without the use of human announcers. Another problem with many traffic reports is that are not updated often enough.

One solution that has been implemented includes collecting traffic data in real time, categorizing the data and entering that data into a database. Traffic information from the database can then be sent to a laptop, transmitted to a pager, made available on the Internet, or provided to a television broadcaster. In one example, the traffic information is sent to a computer that creates a television output that includes map and displays icons indicating the location of the traffic incidents (e.g. delays, backups, accidents, etc.). Text can be scrolled across the screen that describes each of the incidents. The traffic maps can be enhanced with the use of surveillance videos of the incident areas. Typically, the audio track played along with the traffic maps will include music, prestored announcements explaining the Geographic area being reported and/or a human announcer. Although this system provides continuous traffic information, the real time traffic information is presented visually.

The presentation of traffic information will be more effective if the presentation included audio descriptions of the traffic incidents. Some people process audio information better than visual information. Additionally, many people watching morning television programs have the television playing in the background; therefore, they can hear the television but they cannot always see the television. Furthermore, the above described system cannot be used on radio broadcasts. Finally, it would be advantageous if a user can contact a traffic information service by telephone and receive automated traffic information for the user's local area.

Audio has been used in the past for many applications. In many cases the audio is ineffective because it is hard to understand or it is not pleasing to the human ear. For example, synthesizing speech based on text tends to sound unnatural and be prone to errors. Furthermore, simply playing various phrases without taking into account the structure of normal human speech may be difficult to follow. Any system using audio should be flexible enough to arrange the speech to sound similar enough to human speech such that it is pleasing to the ear. In particular, people are accustomed to hearing high quality speech from television. Furthermore, it may be desirable, in some cases, to provide the speech in complete sentences. To date, there is no system that provides automated traffic information using speech that fulfills the above-described needs.

SUMMARY OF THE NVENTION

The present invention, roughly described, is a system for presenting information using prestored speech. In one embodiment, various prestored speech phrases are concatenated and played to a listener. The word concatenate, as used in this patent, means to combine, connect or link together.

In one implementation of the present invention, the method of presenting information using prestored speech includes collecting data, storing the data in a database, retrieving information from the database, building a program and presenting the program. The information being presented is not limited to any specific type of information. For example, the present invention can be used to deliver traffic information, weather information, financial information, sports information and other news items.

In an embodiment of the present invention used to present traffic data, the step of building a program includes creating an audio program file, optionally creating a text program file and optionally creating one or more maps to be displayed while playing the audio program file. The audio program file is created by reviewing the information retrieved from the database in order to determine which of a set of prestored speech files should be used to report the traffic information. The selected speech files are concatenated to form the audio presentation. The speech files may include phrases identifying incident types, locations, severity and/or timing information, as well as other filler words that improves the audio presentation. In one embodiment, the speech files are created, selected and chosen in order to present the speech in complete sentence like manner. The phrase "complete sentence like manner" is used to mean speech that sounds like complete sentences, even if the speech is not grammatically perfect. In one alternative, the ordering of the speech files can be modified while still providing intelligible speech in complete sentence like manner.

The system of the present invention can be implemented using software that is stored on a processor readable storage medium and executed using a processor. For example, the invention can be implemented in software and run on a general purpose computer. Alternatively, the invention can be implemented with specific hardware, or a combination of specific hardware and software, designed to carry out the methods described herein.

These and other objects and advantages of the invention will appear more clearly from the following detailed description in which the preferred embodiment of the invention has been set forth in conjunction with the drawings.

BRIEF DESCRIPTION OF THE DRAWINGS

FIG. 9 is a flow chart describing the process of adding references for incident type information.

FIG. 10 is a flow chart describing the process of adding references for severity information.

DETAILED DESCRIPTION

Figure 1:
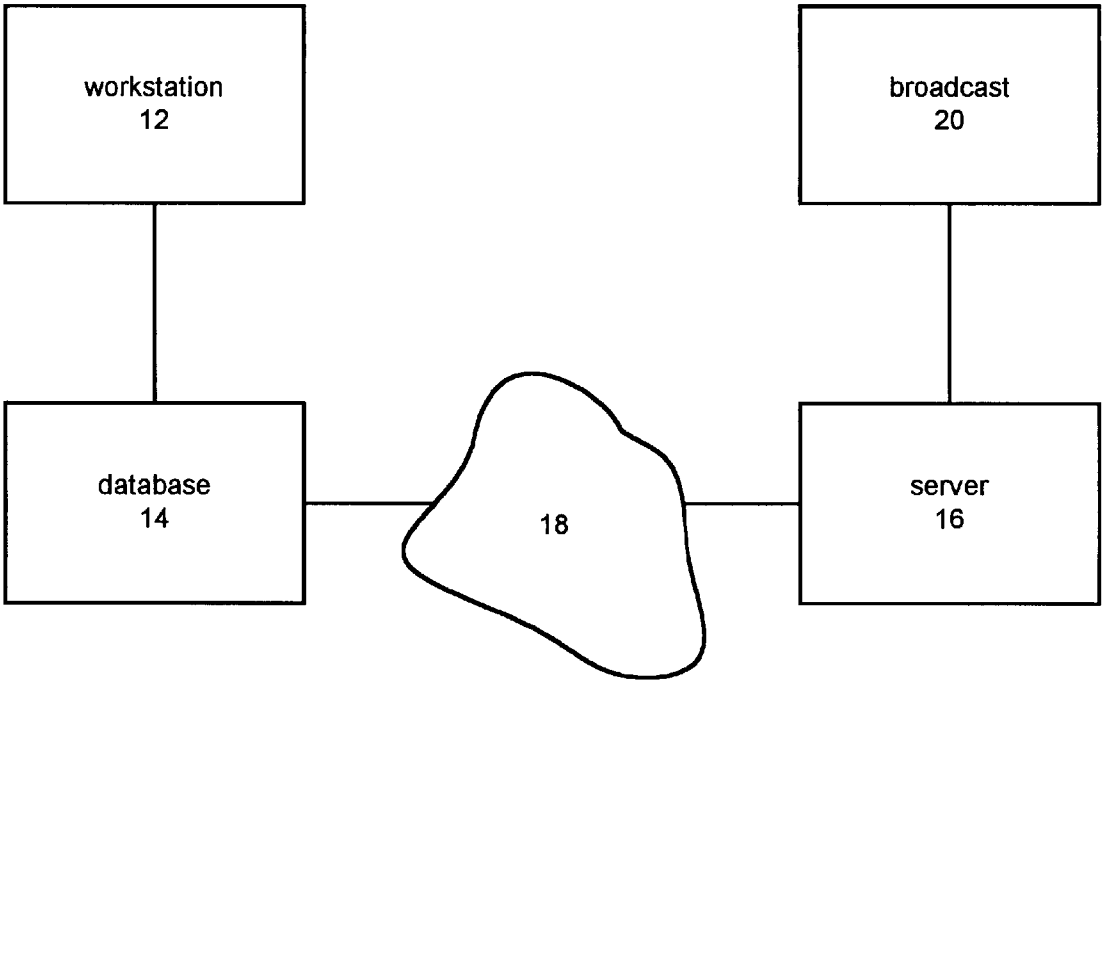
FIG. 1 is a block diagram of a system utilizing the present invention.

FIG. 1 is a block diagram of an information system that can implement the present invention. Prior to using the hardware shown in FIG. 1, a user or operator can gather data. That data is entered into workstation 12. Workstation 12 can be a general purpose computer running software which allows a user to enter data. After the user has entered the data to workstation 12, the data is transferred to a database 14. In one embodiment, database 14 can reside on workstation 12. In another embodiment, database 14 is in a different location than workstation 12, for example, on another computer. Workstation 12 can communicate with database 14 via the Internet, modem, LAN, WAN, or other communication means. It is contemplated that there may be many more workstations throughout a region (or throughout the country, or world) all of which communicate with one database 14 or a set of databases. Database 14 can be accessed by server 16 via communication means 18. In one embodiment, server 16 accesses database 14 via the Internet. Other means for communicating with database 14 include modem, LAN, WAN, or other communication means. The form of communication is not important as long as the bandwidth is acceptable in comparison to the amount of data being transferred. Server 16 receives the data from database 14 and creates a program to be presented to an audience. This program is transmitted to broadcast device 20 which broadcast the program created by server 16. The program can be broadcast by presenting the program on the Internet, broadcasting the program on television (conventional, cable, digital, satellite, closed circuit, etc.), broadcasting on radio, making the program available by telephone dial-up, making the program available by intercom or any other suitable means for broadcasting.

In the embodiment for presenting traffic information, an operator would enter traffic information into workstation 12. Workstation 12 would transmit the traffic information to a national or regional database 14. A broadcaster of traffic information would have a server. That server would access the national or regional database via the Internet (or other communication means) in order to access traffic data for the region being served by the broadcaster. Server 16 would then create an audio and/or video program and broadcast device 20 would broadcast that program.

In one embodiment, the program includes a series of maps with icons showing the location of various traffic incidents. While the map with the icons is being displayed on a video monitor, an audio program is played which describes each of the incidents. In one embodiment, the description of each incident includes the marker identification, the location of the incident, the type of incident, the time needed to clear the incident, information as to the severity of the incident. In one alternative, a user can use a telephone to access broadcast device 20 (or server 16) to have the audio program transmitted over the telephone lines. In another embodiment, server 16 can download information for various regions and the user accessing broadcast device 20 (or server 16) would enter in the user's zip code to access the program for the user's local region.

Figure 2:
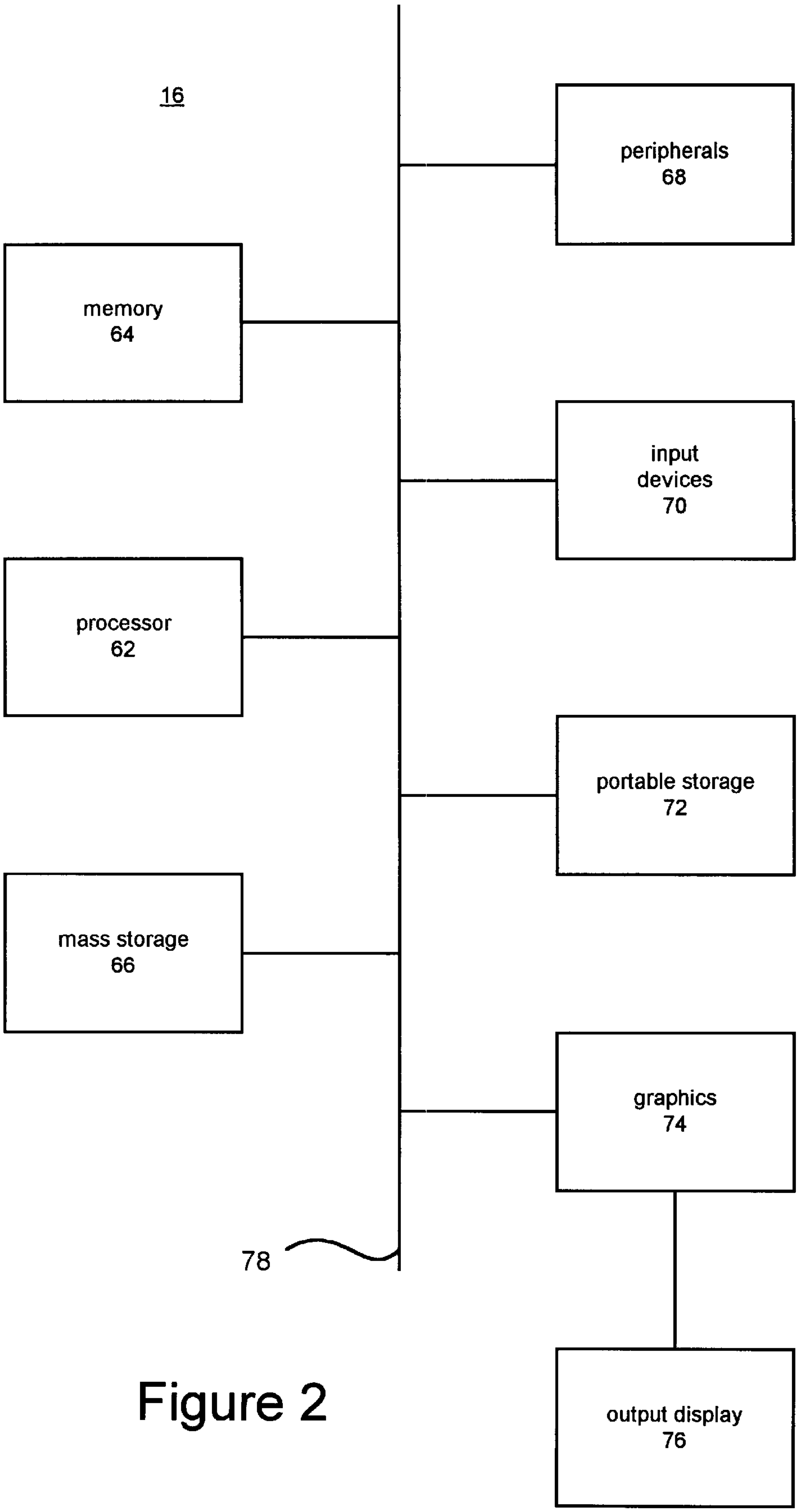
FIG. 2 is a block diagram of a server.

FIG. 2 illustrates a high level block diagram of a general purpose computer system which can be used to implement server 16. In one embodiment, server 16 contains a processor unit 62 and main memory 64. Processor unit 62 may contain a single microprocessor, or may contain a plurality of microprocessors for configuring server 16 as a multiprocessor system. In one embodiment, processor unit 62 is a 200 MHz Pentium Pro processor. Main memory 64 stores, in part, instructions and data for execution by processor unit 62. If the system for presenting information using prestored speech is wholly or partially implemented in software, main memory 64 stores the executable code when in operation. Main memory 64 may include banks of dynamic random access memory (DRAM), as well as high speed cache memory. In one embodiment, main memory includes 64 Megabytes of RAM.

Server 16 further includes mass storage device(s) 66, peripheral device(s) 68, input device(s) 70, portable storage medium drive(s) 72, a graphics system 74 and an output display 76. For purposes of simplicity, the components in server 16 are shown in FIG. 2 as being connected via a single bus 78. However, server 16 may be connected through one or more data transport means. For example, processor unit 62 and main memory 64 may be connected via a local microprocessor bus, and the mass storage device(s) 66, peripheral device(s) 68, portable storage medium drive(s) 72, graphics system 74 may be connected via one or more buses. Mass storage device(s) 66, which may be implemented with a magnetic disk drive or an optical disk drive, is a non-volatile storage device for storing data and instructions for use by processor unit 62. In one embodiment, mass storage device 66 stores all or part of the software for the present invention. One embodiment of mass storage device 66 includes a set of one or more hard disk drives to store video and/or audio (including the prestored audio files). In one alternative, server 16 may also include a Panasonic Rewritable Optical Disc Recorder.

Portable storage medium drive 72 operates in conjunction with a portable non-volatile storage medium, such as a floppy disk, to input and output data and code to and from server 16. In one embodiment, the software for presenting information using prestored speech is stored on such a portable medium, and is input to the server 16 via the portable storage medium drive 72. Peripheral device(s) 68 may include any type of device that adds additional functionality to server 16. For example, peripheral device(s) 68 may include a sound (or audio) card, speakers in communication with a sound card, one or more network interface cards for interfacing server 16 to a network, a modem, an 8-port Serial Switcher, input/output interface, etc.

Input device(s) 70 provide a portion of the user interface for a user of server 16. Input device(s) 70 may include an alpha-numeric keypad for inputting alpha-numeric and other information, or a pointing device, such as a mouse, a trackball, stylus, or cursor direction keys.

In order to display textual and graphical information, server 16 contains graphics system 74 and the output display 76. Output display 76 may include a cathode ray tube (CRT) display, liquid crystal display (LCD) or other suitable display device. Graphics system 74 receives textual and graphical information, and processes the information for output to output display 76 or another device, such as broadcast device 20. One example of a graphics system is a video card (or board). One exemplar board is the Perception PVR-2500, which can be used to generate an NTSC signal from a digital image. That NTSC signal can be sent to a television, a monitor or to another hardware system (e.g. for broadcast or recording), such as broadcast device 20.

The components contained in sever 16 are those typically found in many computer systems, and are intended to represent a broad category of such computer components that are well known in the art. The system of FIG. 2 illustrates one platform which can be used for the present invention. Numerous other platforms can also suffice, such as Macintosh-based platforms available from Apple Computer, Inc., platforms with different bus configurations, networked platforms, multi-processor platforms, other personal computers, workstations, mainframes, and so on. In one embodiment, software and data server 16 can be updated remotely.

Figure 3:
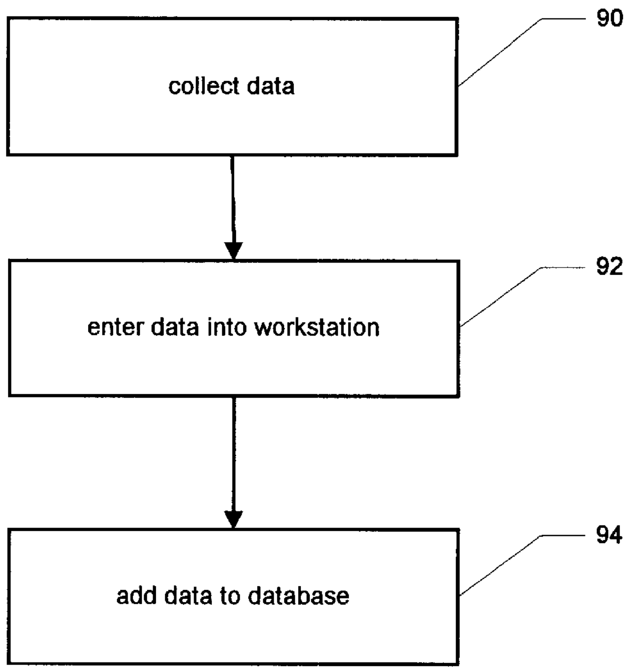
FIG. 3 is a flow chart describing the process of adding data to a database.

FIG. 3 is a flow chart which describes the steps of adding data to database 14. In step 90, data is collected. For the traffic information system, various persons may call into a central location to report accidents, bottlenecks, and other traffic incidents. Alternatively, a helicopter or other vehicle can be used to travel around an area and look for traffic incidents. Various other means for collecting data are also contemplated. In embodiments using other types of data, the data can be gathered in a manner most appropriate for the particular data. For example, human observers or sophisticated measuring equipment can be used to gather weather information. For purposes of this discussion, almost all data can be divided into incidents. For instance, each region of weather, each new story, each sports score, etc. can be thought of as an incident.

In step 92, the collected data is entered into workstation 12. In step 94, workstation 12 provides the new data to database 14. In one embodiment, workstation 12 can talk directly to server 16 and database 14 would reside on server 16. In an alternative embodiment, workstation 12 and database 14 can both be implemented on the same computer as server 16.

In one embodiment, step 92 is performed by entering data using a graphical user interface (GUI). The GUI includes various fields for inputting data. A first field allows a user to enter either a primary road or a landmark, but not both. The second field is a Direction field which allows a user to enter the direction of travel affected by the incident. The third field is the Cross Road field which allows the user to select the closest major cross street to the incident. Other optional fields can allow the user to enter additional cross streets, landmarks and other location information. The fourth field allows a user to select a region in which the incident is located. The region can be a county, town, neighborhood, etc. The next field allows a user to select the type of incident. In one embodiment, the type of incident can be selected from a set of ITIS (International Traveler Interchange Standard) codes. The ITIS codes are predefined situations that describe information that might be important to travelers. These ITIS codes are well known in the art. In another embodiment, a list of codes are set up that describe various types of traffic incidents. The types of traffic incidents can vary from location to location. The extent, number and content of the various traffic incident options can vary without affecting the scope of the present invention. Some examples of traffic incidents are "traffic is stopped," "traffic is stop and go," "traffic is slow," "there is an accident," etc. The next field allows a user to enter a time that the incident will be cleared. The next field allows a user to enter an impact severity., which describes how severe the accident or traffic condition is. An optional field can be used to assign a priority to the incident. Other fields that can be used include recommended diversions to avoid the incident and a free form text field to add further comments. In some embodiments, the location of the incident can be entered by an operator using a pointing device to select a position on a map in a GUI.

Figure 4:
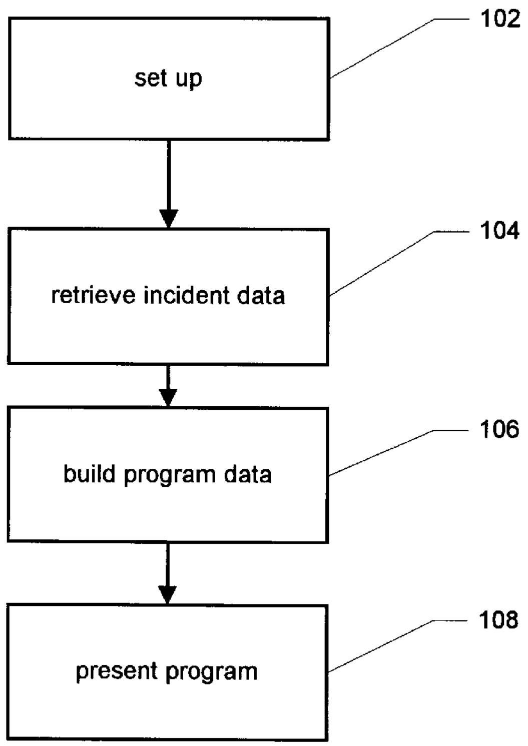
FIG. 4 is a flow chart describing the process of presenting data according to the present invention.

FIG. 4 describes the steps of presenting information (such as traffic information) using prestored. In step 102, the presentation is set up. That is, a user scripts the program. Scripting the program includes selecting which maps to display, the order that the maps will be displayed, whether text messages will be used, and adding additional speech to the presentation. The additional speech is speech other than traffic information. For example, the user may wish to add an introduction line "Bob, what's the traffic situation?" Alternatively, the operator can add advertisements, testimonials, or any other information. Step 102 can be performed by using a GUI on server 16. In step 104, server 16 retrieves data for the various incidents from database 14. That is, by knowing what maps are used in the program, server 16 accesses database 14 and retrieves data for all current incidents that are within the region represented by the maps designated during set up step 102. For each incident, the following data is retrieved: incident identification, type of incident, location code, main street and cross street, severity, latitude and longitude of incident and free text added by the operator (optional). In some cases, certain components of the data may not be included for one or more incidents. In step 106, server 16 builds the program data which is used in step 108 to present the program.

The steps of FIG. 4 can be performed in the order depicted in FIG. 4 or in other suitable orders. For example, step 102 can be performed first and re-performed at any time. Step 104 can be performed on demand or automatically at a predefined time interval. Step 106 can be set up to be performed on demand, or anytime either step 102 or step 104 are performed. Step 108 can be performed on demand, automatically at a predefined time interval (e.g. every 2 minutes), automatic in a continuous fashion or every time step 106 is performed. In another embodiment, step 108 can be performed after a user interaction.

Figure 5:
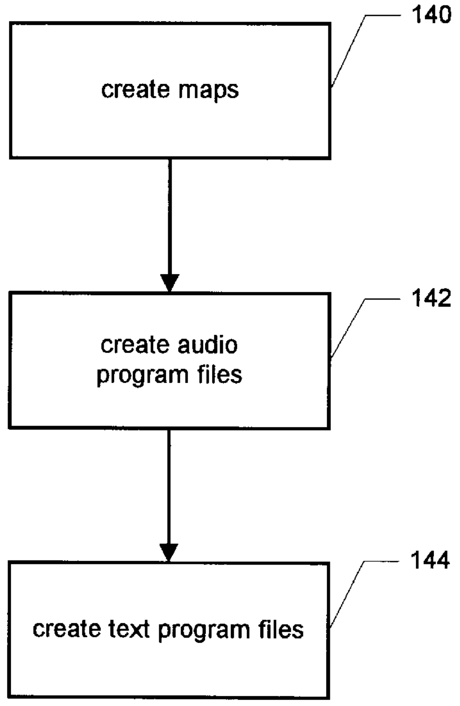
FIG. 5 is a flow chart describing the process of building program data.
Figure 6:
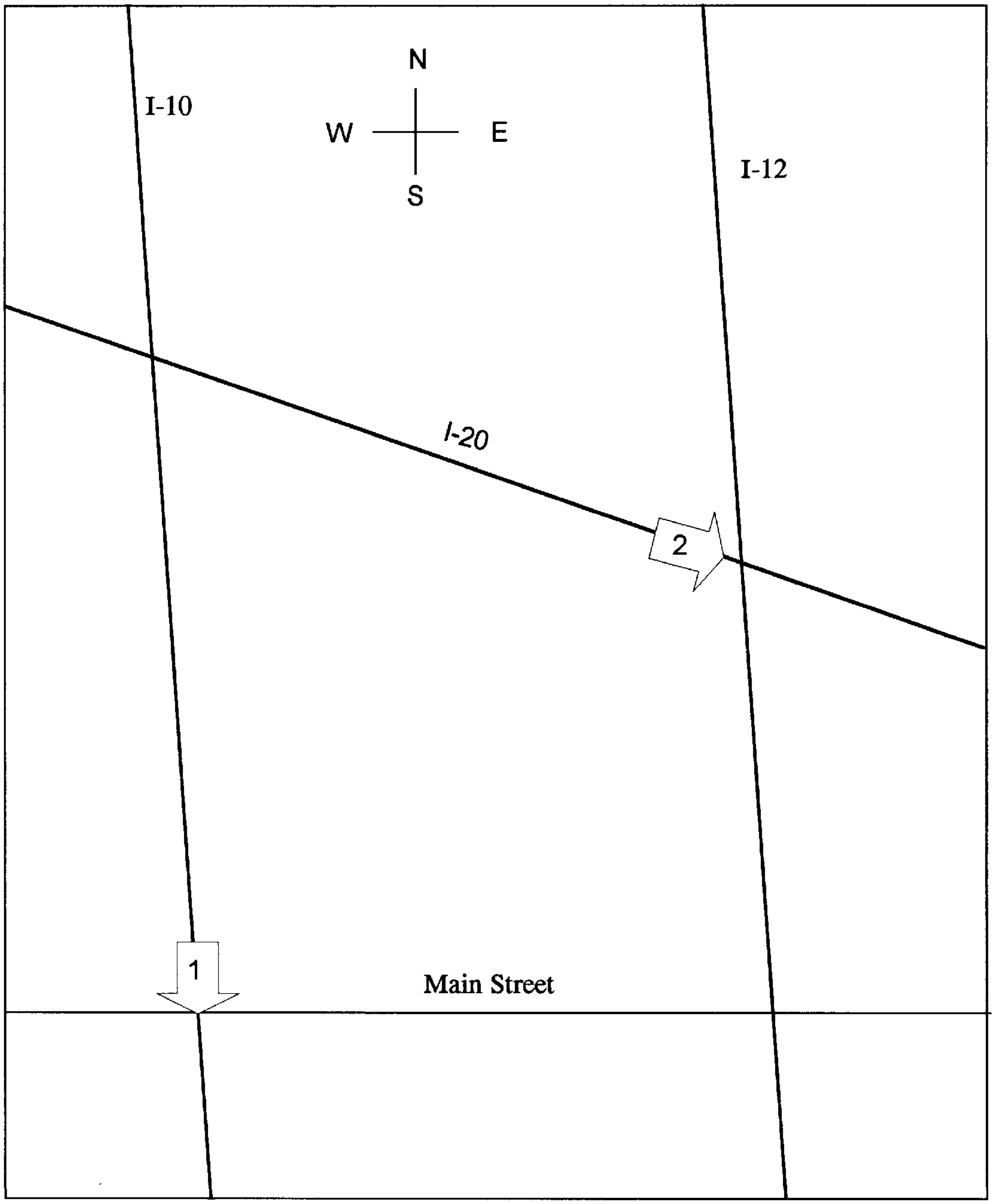
FIG. 6 is a portion of a map.

FIG. 5 is a flow chart which describes step 106 of FIG. 4, building the program data. In step 140, server 16 creates the maps. Map databases and the generation of graphical maps from map databases is well known in the art. Any suitable method for drawing a map can be used. Typically, graphical maps are created by the generation of a vector file or bit map type file. For example, when creating a bit map file for a map, longitude and latitude positions can be translated to pixel positions. The translation of longitude and latitude is used to place icons on the map which represent the location of the incidents. In one embodiment, the size, shape or color of the icon can be different for different types of incidents or different types of severity. FIG. 6 shows an example of a portion of a map created using a map database. The portion of the map shows three highways, I-10, I-12 and I-20. The map also shows a major street labeled as Main Street. The map shows two icons (which are also called markers), marker 1 and marker 2. Marker 1 represents an incident southbound on I-10 at Main Street. Maker 2 represents an incident eastbound on I-20 at I-12. In the map of FIG. 6, the icons representing the markers are large arrows. Other shapes and sizes can also be used for the icons.

After the maps are created in step 140, server 16 creates the audio program files in step 142 and the text program files in step 144. The audio program files are files stored on server 16 which include a number of references to audio files. In one embodiment, there is one audio program file per map and each audio program file includes the references for each incident depicted in the map. The audio program files can be thought of as a script for the audio program. In other embodiments, there can be one audio program file for all the maps.

In one alternative, step 144 is not performed and there are no text program files. In one embodiment, steps 140, 142 and 144 are performed sequentially. In another embodiment, the three steps are performed for a first map, then all three steps are performed for a second map, then all three steps are performed for a third map, etc. In another embodiment, the steps can be performed simultaneously, or in another order. In one alternative, step 142 is performed but steps 140 and 144 are not performed. If step 108 of FIG. 4 is being performed automatically (e.g. without the requirement of user initiation) then the steps of FIG. 5 will be performed automatically. In one instance, steps 140–144 are performed for a first map, then for a second map, etc., until steps 140–144 are performed for all the maps and then the cycle is repeated and steps 140–144 are performed for all of the maps again, and so on.

Figure 7:
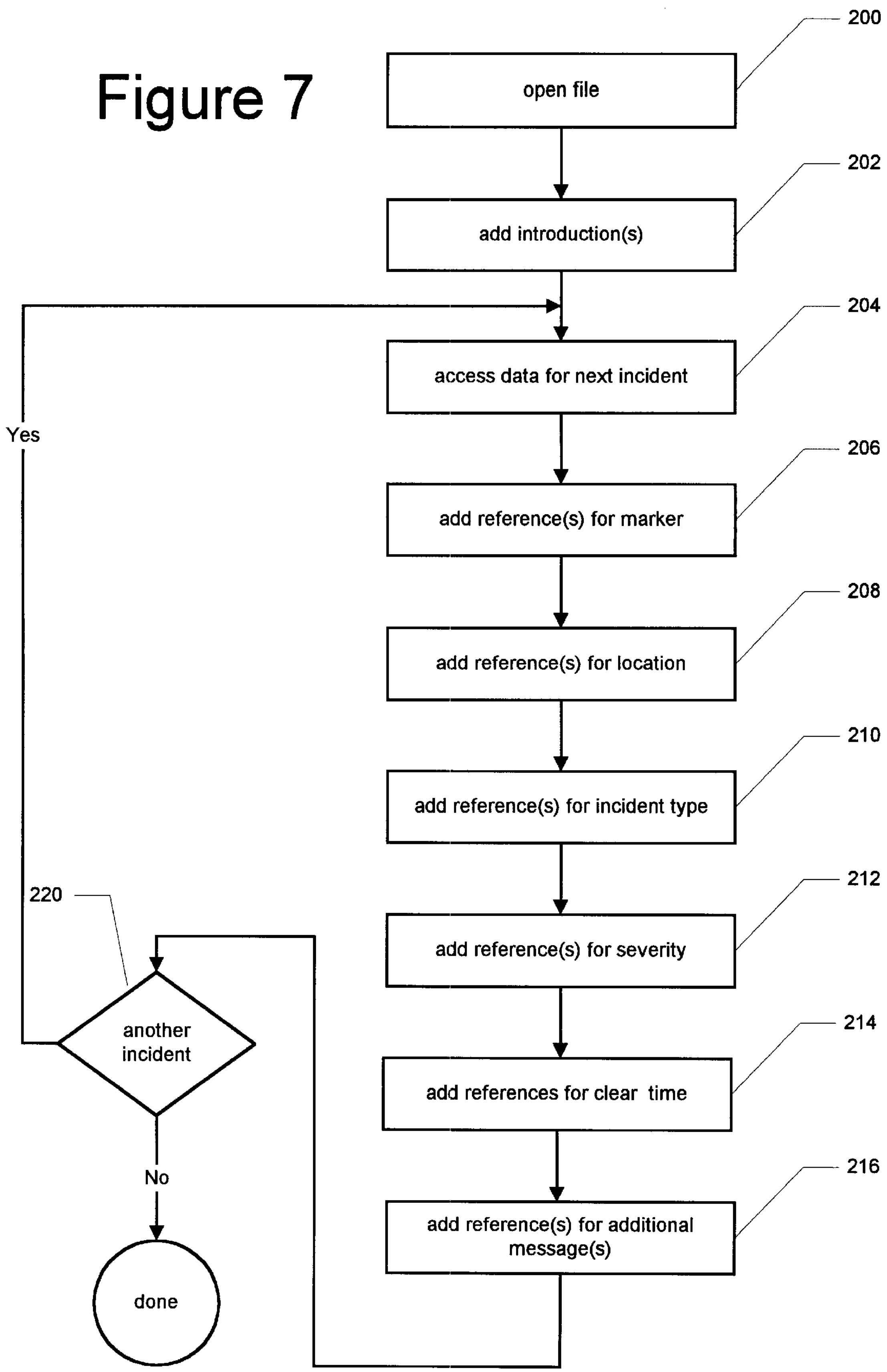
FIG. 7 is a flow chart describing the process of creating audio program files.

FIG. 7 is a flow chart which describes step 142 of FIG. 5, which includes creating audio program files. The steps of FIG. 7 create one audio program file that is used to describe all the incidents for a single map. Thus, the steps of FIG. 7 are performed once for each map. In step 200, a new audio program file is opened. In step 202, one or more references to an audio file storing the introduction are added to the audio program file. The term reference to an audio file refers to anything that properly identifies or points to the audio file. For example, a reference can be a file name. In one embodiment, the audio files are .wav files. Other audio file formats can also be used. One example of an introduction may be, "Bob, how is the traffic?"

While it is possible to synthesize the speech for any audio file needed, it is contemplated that it is more efficient to use prestored audio files. That is, prior to operation of the system, a person in a recording studio will record all the audio files to be used for the current invention. The number, content and other details of the audio files may be geographic specific.

In one embodiment of the present invention, the prestored speech files are recorded using the voice of the same individual under similar conditions. The speech files can be post processed after recording so their average intensities are equalized. Additionally, different emphasis and intonations can be used when recording the speech files based on whether the speech will be used at the beginning, middle or end of a sentence. It is also contemplated that unnatural pauses in and between audio files be avoided.

After adding the introduction, which is an optional step, data is accessed for the next incident (step 204). In step 206, one or more references to audio files that identify the marker are added to the audio program file. In step 208, one or more references to audio files that identify the location of the incident are added to the audio program file. In step 210, one or more references to audio files that identify the type of incident are added to the audio program file. In step 212, one or more references to audio files that identify the severity of the incident are added to the audio program file. In step 214, one or more references that describe the time needed to clear the incident are added to the audio program file. In step 216, one or more references for one or more additional messages are added to the audio program file. At this point, all the references to audio files which describe the current incident being considered have been added to the audio program file. Subsequently, in step 220, server 16 determines whether there is another incident to process. If there are no more incidents to process, then the method of FIG. 7 is done. If there is another incident to process, then server 16 loops back to step 204 and accesses data for the next incident to be processed.

Table 1, below, shows an example of an audio program file.

TABLE 1

| |
|---|
| INTRO1. |
| Mkr001, LOC3000, Pm101. |
| Mkr002, dirE, Hwy20, CHwy12, Pm201, Sev02, ctime, Hour1, tm30. |
| MSG1. |
| END. |

As can be seen, Table 1 includes five lines. The first line includes a reference, INTRO1, to an audio file which will include the speech for the introduction. The second line includes all the references for the audio files which describe the first incident. The first reference, Mkr001, is a reference to an audio file which identifies the icon or marker as "marker 1." The second reference, LOC3000, is a reference to an audio file which includes speech stating "southbound on I-10 at Main Street." The next reference, Pm101, is a reference to the file which includes the speech indicating the incident type as "the traffic is stopped."

The third line of Table 1 includes the references for the audio files which describe the second incident. For example, the third line includes a reference, Mkr002, which is the file name of an audio file that includes the speech "at marker 2." The next three references on line 3 are all location references: dirE, Hwy20, and CHwy12. The reference dirE is the name of an audio file which contains the speech "Eastbound." The second reference, Hwy20, is the name of an audio file which includes the speech "on Highway 20 at." The next reference, CHwy12, is the name of an audio file which includes the speech "Highway 12." After the location references is the incident type reference, Pm201, which is the name of an audio file which contains the speech "there is an accident." The next reference, Sev02, is a name of an audio file which describes the severity as "which is severely impacting the flow of traffic." The next reference, ctime, is the name of an audio file which indicates the clear time "the accident is expected to be cleared in." The reference Hour1 is the name of an audio file which states "one hour and." The following reference, tm30, is the name of an audio file which includes the speech stating "thirty minutes." The fourth line includes one reference, MSG1, which is a name of an audio file used to include any miscellaneous message such as an advertisement: "It's raining, so don't forget to bring your Brand X umbrella." Using a message (e.g. MSG1) is optional. The last line of the file depicted on Table 1 includes one reference, END, which is the name of an audio file which gives a departing remark. For example, the file may include the speech "That's all the traffic in this part of town."

Other formats for the audio program file can also be used. For example, a NULL can be placed at the end of every fine or at the end of each line that does not include a reference for severity information (or other type of data). In other embodiments, the introduction (INTRO) and departing remark (END) can be in a separate audio program file, or can be played prior to, after and/or separate from the method of the present invention.

In one embodiment, the present invention will concatenate all the audio files referenced in the audio program file of Table 1 to create an output audio file. The output audio file will be played such that the speech is presented in a complete sentence like manner. The ability to provide speech in a complete sentence like manner is achieved by using multiple phrases which are designed wisely and concatenated wisely. In some cases, strategic pauses are used.

The speech files should contain appropriate filler words such "as, at, on, near, is, not, etc." For example, the audio resulting from the audio program file of Table 1 would be similar to the following "Let's look at today's traffic. At marker 1, southbound on I-10 at Main Street, traffic is stopped (pause). At marker 2, eastbound, on Highway I-20 at I-112, there is an accident which is severely impacting traffic, the incident is expected to be cleared in one hour and thirty minutes. It's raining today so don't forget your Brand X umbrella. That's all the traffic in this part of town." Note that the audio information for each marker can vary in size. Each incident does not necessarily need to provide audio for all possible types of data including location, incident type, severity, clear time and additional messages. Furthermore, references to audio files can be added for additional messages or filler words.

Figure 8:
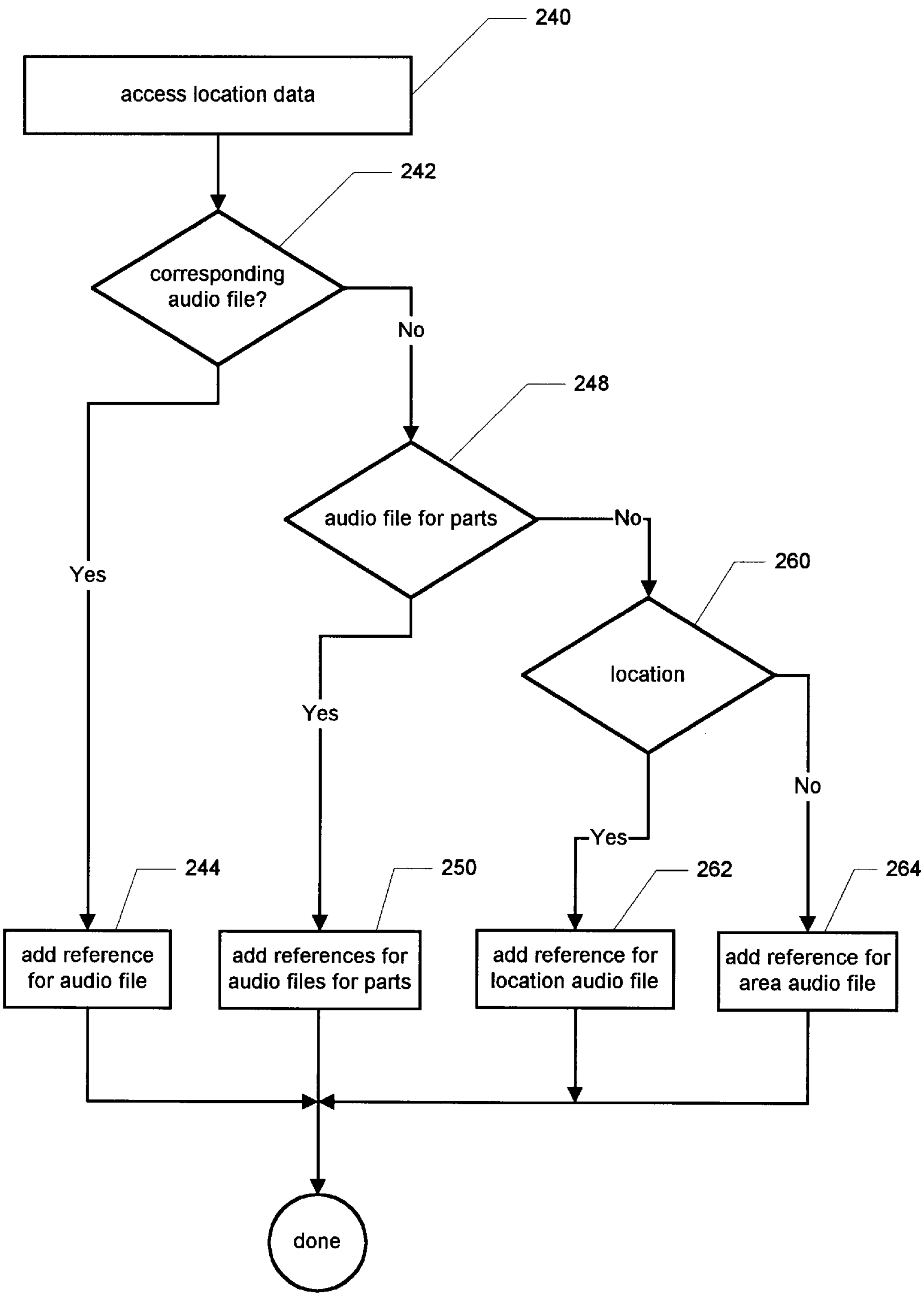
FIG. 8 is a flow chart describing the process of adding references for location information.

FIG. 8 is a flow chart which describes step 208, adding references for location information. In step 240, server 16 accesses the location data for the current incident. In step 240, server 16 accesses a location table. In step 242, the server determines whether there is a corresponding reference to an audio file for the accessed location code. Table 2 is an example of a portion of a location table.

TABLE 2

| LOCATION CODE | NAME | XSTREET | REFERENCE |
|---|---|---|---|
| 3000 | I-10 SB | Main Street | LOC3000 |
| 3001 | I-10 SB | Tomahawk Rd | LOC3001 |
| 3002 | I-10 SB | Idaho Rd | LOC3002 |
| 3003 | I-10 SB | Ironwood Dr | LOC3003 |
| 3004 | I-10 SB | Signal Butte Rd | LOC3004 |
| 3005 | I-10 SB | Crimson Rd | LOC3005 |

The location table of Table 2 includes four columns. The first column includes location codes which is retrieved from the database. The second column is the main street and the third column is the cross street. The fourth column of Table 2 is the reference for the corresponding audio file for the location code. If, in step 240, the location code is found in the table with a corresponding reference to an audio file, then the reference to the audio file in the fourth column is added to the audio program file in step 244. For example, if the location code for the current incident is 3000, then the reference LOC3000 is added to the audio program file. If, during step 240, there is no reference to an audio file in the location table, then server 16 (in step 148) determines whether there are audio files for all the parts of the location. As discussed above, the parts of the location include the direction, main street and cross street. Thus, server 16 will look in a direction table and a street table.

Table 3 is an example of part of a street table.

TABLE 3

| REFERENCE | STREET |
|---|---|
| Hwy20 | Highway 20 |
| Grant | Grant Street |
| Spruce | Spruce Street |

Table 3 includes two columns. One column is the street and the other column is the reference to the corresponding audio file. If the appropriate tables include references to audio files for the cross street, main street and direction, then the appropriate references are added to the audio program file in step 250. If there is not an audio file for all the parts, then server 16 determines whether the location information is a landmark rather than a street (step 260). If the location information is a landmark, then server 16 accesses a landmark table to add a reference for the audio file with speech stating the landmark name (step 262). Table 4 is an example of part of a landmark table. The table includes two columns. One column includes the landmark and the other column includes the names of the corresponding audio files which state the landmark's name.

TABLE 4

| REFERENCE | LANDMARK |
|---|---|
| Lmk001 | Zoo |
| Lmk002 | Park |
| Lmk003 | Arena |

If, in step 260, it is determined that the location information does not include a landmark, then server 16 does not have the appropriate audio files to exactly identify the location. In this case, step 264 is used to provide a less precise audio description. In one embodiment, the less precise audio description is speech that states the area of the incident. A reference for the appropriate speech is accessed in an area table. In one embodiment, the area of the incident is included in the information retrieved from the database. In another embodiment, the area can be determined by the latitude and longitude or the other location information. If there is no information to determine an area, then a default area will be used. Table 5 is an example of part of an area table. The table includes two columns. One column includes the areas and the other column includes corresponding names of audio files which state the name of the area.

TABLE 5

| REFERENCE | AREA |
|---|---|
| A001 | Scottsdale |
| A002 | Mesa |
| A003 | Chandler |

FIG. 9 is a flow chart which describes step 210 of FIG. 7, the step of adding references for the incident type. In step 280, server 16 accesses the incident type date for the incident under consideration. In step 282, server 16 looks up the incident data in an incident table. Table 6 is an example of a portion of an incident table. The incident table includes four columns. The first column is a code identifying the incident. The second column is a text description of the incident. In one embodiment, the various tables will not include descriptions such as the incident description or location description. The third column is an indication of whether it is appropriate to include severity for the particular incident type. The fourth column is a reference to an audio file.

TABLE 6

| CODE | MESSAGE | SEVERITY | REFERENCE |
|---|---|---|---|
| 101 | the traffic is stopped | No | PM101 |
| 102 | the traffic is stopped for half mile | No | PM102 |
| 103 | the traffic is stopped for one mile | No | PM103 |
| 104 | the traffic is stopped for 3 miles | No | PM104 |
| 105 | the traffic is stopped for 5 miles | No | PM105 |
| 108 | there is stop and go traffic | No | PM108 |
| 109 | there is stop and go traffic for 1 mile | No | PM109 |
| 110 | there is stop and go traffic for 2 miles | No | PM110 |

TABLE 6-continued

| CODE | MESSAGE | SEVERITY | REF-ERENCE |
|---|---|---|---|
| 112 | there is stop and go traffic for 4 miles | No | PM112 |
| 113 | there is stop and go traffic for 5 miles | No | PM113 |
| 115 | there is slow traffic | No | PM115 |

In some instances, more than one incident type will include a reference to the same audio file. If the incident type being looked up in step 282 includes a reference to an audio file, then (in step 284) server 16 adds to the audio program file a reference to the audio file. If, in step 282, the incident type being looked up does not include a corresponding reference to an audio file, then a default audio reference is added to the output file in step 286. One example of a default audio file would state "There is an incident."

FIG. 10 is a flow chart describing step 212 of FIG. 7, which adds references for the severity of the incident. In step 300, server 16 accesses the associated severity data for the incident being considered. In step 302, server 16 accesses the incident table and looks to see (in step 304) if it is appropriate to add severity for that particular incident under consideration (see the third column of Table 6). If the incident table indicates that severity messages are appropriate for the current incident, then a reference to the appropriate severity audio file is added in step 306. If a reference is not appropriate, then step 306 is skipped. In one embodiment, there are four types of severity: high, medium, low and none. These four types of severity can translate to four different audio files which state "which is severely impacting traffic," "which is moderately impacting traffic," "which has a mild impact on traffic," or "which is not impacting traffic." The exact words used is not as important as the content. Since there are only three severity audio files, there is no need to use a table. In other embodiments, more severity indications can be used. As an example, consider if the incident type is code 108, "there is stop and go traffic." Looking at Table 6, the corresponding severity column for incident code 108 says "No." That means that it is not appropriate to add severity information for this incident type. If the incident value was a "Yes" then the appropriate reference for the severity audio file would be added to the output file.

Figure 11:
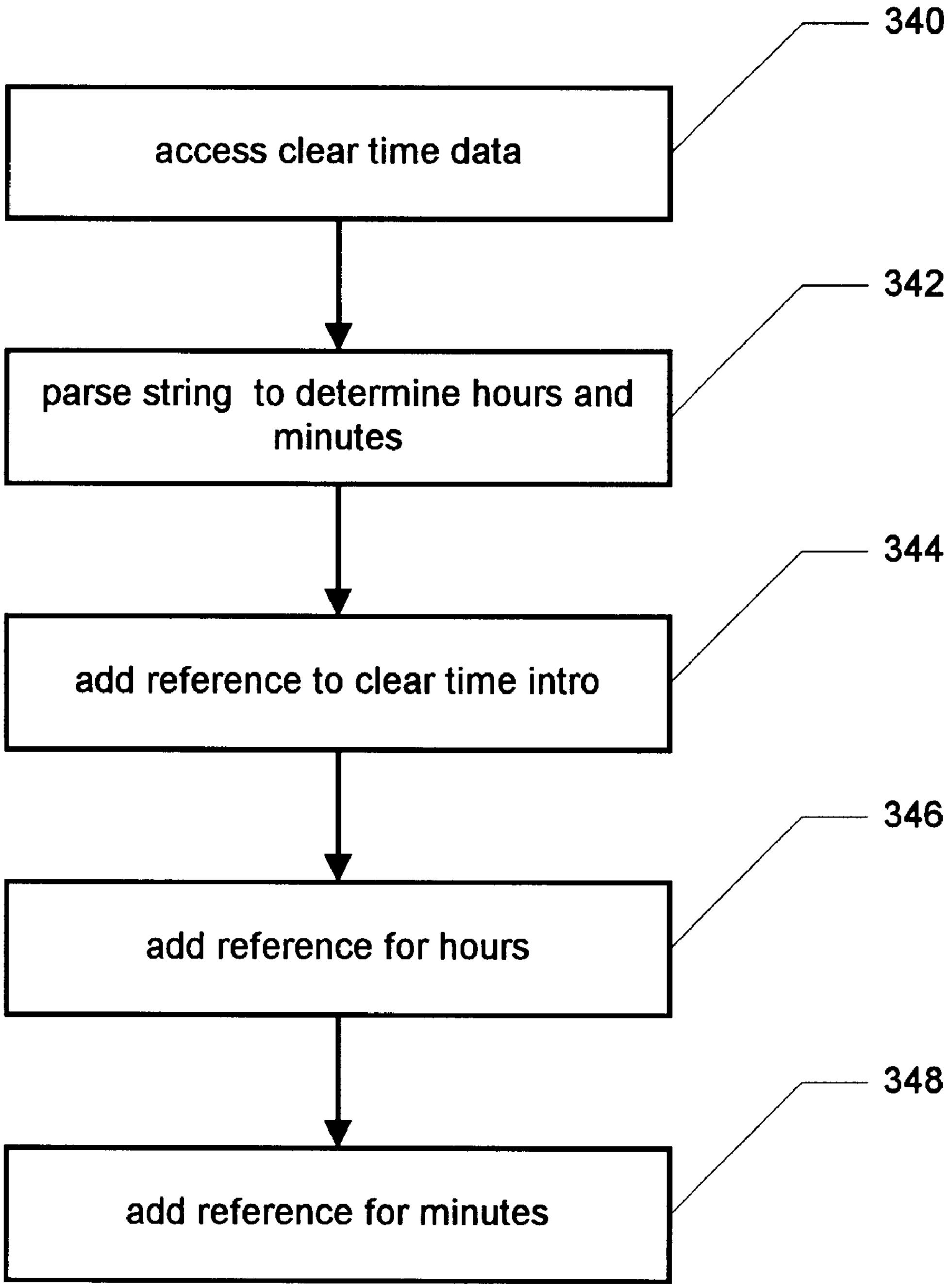
FIG. 11 is a flow chart describing the process of adding references for clear time information.

FIG. 11 is a flow chart which describes step 214 of FIG. 7, which is the step of adding references for clear time. In step 340, server 16 access the clear time data for the incident under consideration. In step 342, the clear time data, which is an ASCII string, is parsed to determine the number of hours and the number of minutes. In step 344, a reference is added for the clear time introduction audio file. In step 346, a reference is added for the hours audio file. In step 348, a reference is added to the audio program file for the minutes audio file. In one embodiment, the minutes value is rounded up to the nearest multiple of ten, and the appropriate audio file is referenced.

Step 144 of FIG. 5, the creation of the text program files, is performed in a similar fashion as step 142 of FIG. 5.

Figure 12:
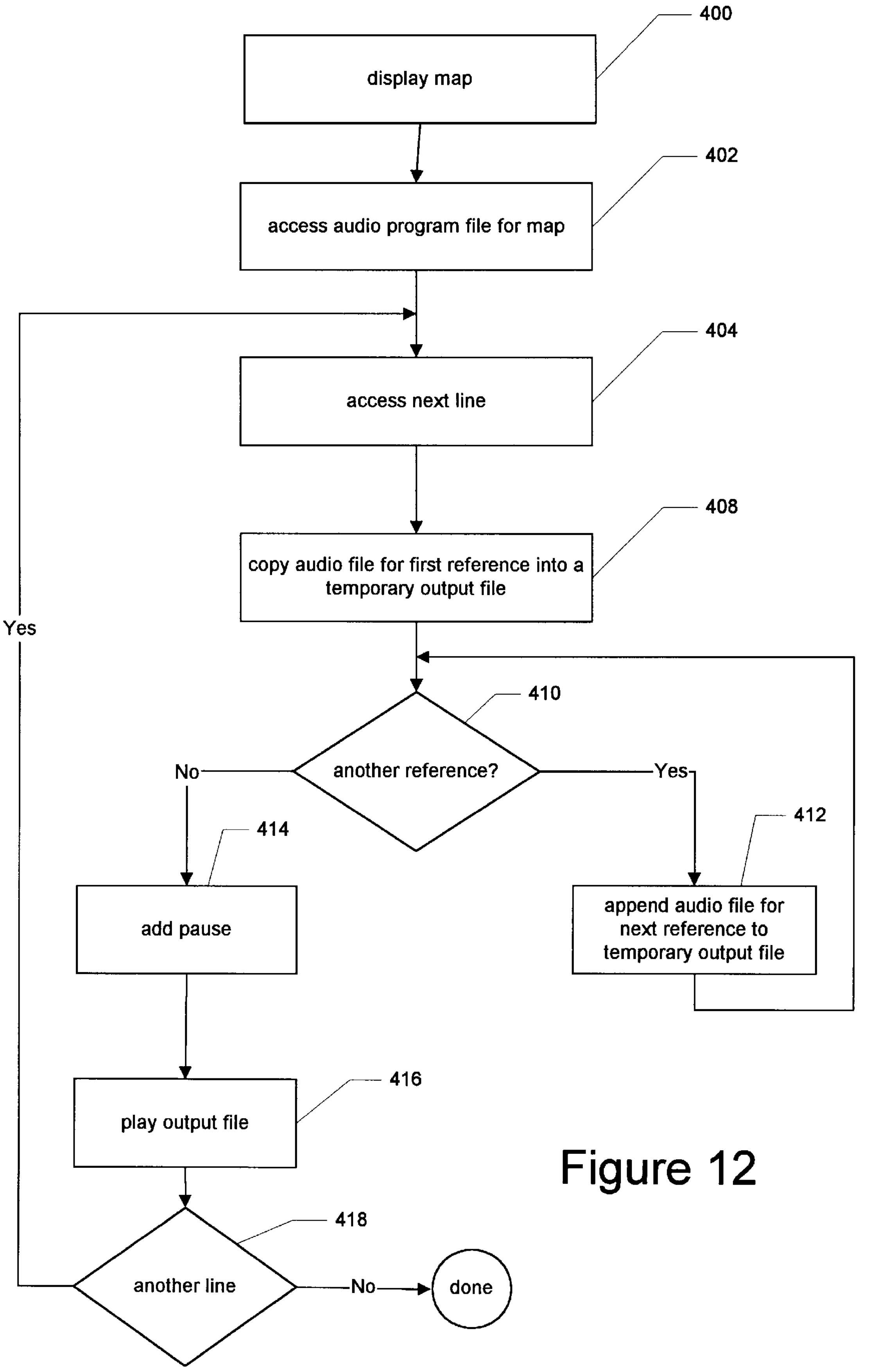
FIG. 12 is a flow chart describing the process of presenting a program.

After completing step 106 of Figure of FIG. 4, step 108 is performed by server 16. Step 106 can also be performed by server 16 in combination with broadcast unit 20, or another combination of hardware. FIG. 12 is a flowchart which describes the method of presenting the program (step 108). The steps of FIG. 12 are performed once for each map that is part of the program. In step 400, a map is displayed. Step 400 could include actually displaying the map on a monitor or generating the NTSC signals (or other video format) for output to a broadcast device or any other hardware or software. In step 402, server 16 accesses the audio program file of the current map being displayed. In step 404, server 16 will access the references for the next line in the audio program file. If it is the first time that step 404 is being performed for a map, then server 16 will be accessing the first line. In step 408, server 16 copies the audio file for the first reference into a temporary output file. In step 410, server 16 determines whether there are any more references for the current line. If there is another reference (in step 410), then in step 412 server 16 appends the audio file for the next reference to the temporary output file and loops back to step 410. In step 410, if it is determined that there are no more references for the current line, then the system proceeds to step 414 and adds a pause. In one embodiment, the pause is 400 milliseconds. Different pause lengths can be used. Additionally, in step 412, a smaller pause can be added between each audio file to make the output audio sound more natural. The pause of step 414 is optional, and can be omitted.

After adding a pause, the system plays the output file in step 416. Step 416 can include playing the audio on speakers or headphones connected to server 16, generating an audio signal on a telephone line, generating a signal communicated to broadcast device 20 (or other hardware), broadcasting the audio, communicating the output file or any other means for communicating the audio information. In one alternative, the output file can be eliminated by storing the actual audio in the audio program file, rather than storing references.

The system determines, in step 418, whether there are any more lines of references to process. If there are more lines, then server 16 loops back to step 404 and accesses the next line of references. When server 16 next performs step 108, a new temporary file is used. If there are no more lines to process, then the method of FIG. 12 is completed.

In the embodiment where the audio files are in .wav format, step 408 includes actually copying the .wav file into the output file. In step 412, the .wav file is appended to the output file. Note that a .wav file has two major components: a header and a body. When appending a .wav file in step 412, the body of the .wav file is copied to the end of the output file; however, the header is not copied. The body contains the actual speech information. When a .wav file is appended to the output file in step 412, the header of the output file must be updated to take into account the new audio information added to the output file. For purposes of this patent, concatenating audio files includes (but is not limited to) step 408 (copying) and step 412 (appending), whether operating on original files or copies of files. Concentrating files can also include playing files one after another in succession.

In one embodiment, step 400 is performed prior to steps 402–418. However, in other embodiments, step 400 can be performed simultaneously or after steps 402–418. In another embodiment, step 400 is not performed. For example, the output file can be generated and played as part of a telephone access or radio broadcast traffic system. In one embodiment, the marker being described by the audio is highlighted.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for reporting traffic information using prerecorded audio, comprising the steps of:

receiving data for a set of traffic incidents, said data including parameters for each of said traffic incidents, one or more of said parameters include at least one code representing a value for said parameter;

identifying groups of files that store speech for describing said traffic incidents, each group of files is associated with at least one of said incidents, said step of identifying groups comprises the steps of:

for each incident of at least a subset of said traffic incidents, accessing parameters for said incident, and for each parameter of at least a subset of said accessed parameters, identifying one or more files that store speech using a set of information correlating codes for said parameter to references to audio files; and automatically presenting said stored speech from each group of files.

2. A method according to claim 1, further including the step of:

concatenating speech stored in said files within each group.

3. A method according to claim 1, wherein:

said step of automatically presenting includes playing said stored speech in a complete sentence like manner.

4. A method according to claim 1, wherein:

said groups of files vary in number of files per group depending on how many parameters are associated with a particular incident and how many audio files are needed to describe each parameter associated with said particular incident.

5. A method according to claim 1, wherein:

said step of receiving includes receiving a first code for a first data value;

said step of identifying groups of files includes identifying a first file storing speech which exactly identifies said first data value, if said set of information directly correlates said first code to said first file; and said step of identifying groups of files includes identifying a second file storing speech which identifies a less precise audio description of said first data value if said set of information does not directly correlate said first code to said first file.

6. A method according to claim 1, further including the step of:

building a program, said step of automatically presenting includes a step of presenting said program.

7. A method according to claim 6, wherein:

said program includes said stored speech from each group of files;

said step of presenting said program includes displaying a video of a map of roads, said map includes one or more incident markers; and said step of presenting said program includes playing speech describing traffic conditions at each incident markers while said map is displayed.

8. A method according to claim 6, wherein:

said program includes said stored speech from each group of files;

said step of presenting said program includes automatically displaying a video of maps of roads, each map includes one or more incident markers; and said step of presenting said program includes playing speech describing traffic conditions at each incident marker while a corresponding map is displayed.

9. A method according to claim 1, wherein:

said files in a particular group include speech describing location, incident type, severity and clear time.

10. A method according to claim 1, wherein:

said files in a particular group include speech for filler phrases.

11. A method according to claim 1, further including the step of storing references for said files in said groups, said step of automatically presenting reads said references.

12. A method according to claim 11, wherein:

said step of automatically presenting includes concatenating audio data from said files from each group to form an output file for each group; and said step of automatically presenting includes playing said output file.

13. A method according to claim 1, further including the step of:

playing an introduction message prior to playing said stored speech from each group of files.

14. A method according to claim 1, further including the step of:

adding additional files to said groups, said additional files include filler speech.

15. A method according to claim 1, wherein:

said files include speech phrases, said speech phrases include filler words.

16. A method according to claim 1, further including the step of:

concatenating speech stored in said files within each group, said files are in .wav format, said concatenating of files includes copying speech content without copying header content for a subset of files.

17. A method for reporting traffic information using pre-recorded audio, comprising the steps of:

receiving data for a set of traffic incidents, said received data including first data for a first traffic incident, said first data including a set of parameters describing said first traffic incident;

identifying, based on said first data, a first group of audio files that describe said first incident, said first group of audio files include speech, said step of identifying comprises the steps of:

accessing a first parameter having a first value, accessing information directly correlating values of said first parameter to references to audio files, determining whether said information directly correlates said first value to a first reference to an audio file, identifying, as part of said first group, a first audio file if said information directly correlates said first value to said first reference to said first audio file, and identifying as part of said first group, a second audio file if said information does not directly correlate said first value to any reference to an audio file; and presenting said speech from said first group of audio files in a complete sentence like manner.

18. A method according to claim 17, wherein:

said second audio file includes a less precise audio description for said first value than said first audio file.

19. A method according to claim 17, wherein:

said first audio file provides an entire description for said first value; and said second audio file provides a partial description for said first value.

20. A method according to claim 19, further including the steps of:

building a program, said step of automatically presenting includes a step of presenting said program, said program includes said speech from said first group of files, said step of presenting said program includes displaying a video of a map of roads, said map includes one or more incident markers, said step of presenting said program further includes playing said speech from said group of files while said map is displayed.

21. A method according to claim 19, wherein:

said audio files in said first group include speech describing location, incident type, severity and clear time.

22. A method according to claim 19, wherein:

said files in a particular group include speech for filler phrases.

23. A method according to claim 17, further including the step of:

storing references for said files in said first group, said step of presenting reads said references, said step of presenting includes concatenating audio data from said files from said first group to form an output file, said step of presenting includes playing said output file.

24. A method according to claim 17, further including the step of:

creating an audio program file which includes references to said first group of audio files, said step of presenting includes the steps of reading said references in said audio program file and playing said speech from said first group of audio files.

25. A processor readable storage medium having processor readable code embodied on said processor readable storage medium, said processor readable code for programming a processor to perform a method comprising the steps of:

receiving data for a set of traffic incidents, said data including a set of parameters;

identifying groups of files that store speech for describing said incidents, each group of files is associated with at least one of said incidents, said step of identifying comprises the steps of:

accessing a first parameter having a first value, accessing information directly correlating values of said first parameter to references to audio files, determining whether said information directly correlates said first value to a first reference to an audio file, identifying, as part of a first group of files, a first audio file if said information directly correlates said first value to said first reference to said first audio file, and identifying, as part of said first group of files, a second audio file if said information does not direct correlate said first value to any reference to an audio file; and automatically presenting said stored speech from each group of files.

26. A processor readable storage medium according to claim 25, wherein;

said first audio file provides an entire description for said first value; and said second audio file provides a partial description for said first value.

27. A processor readable storage medium according to claim 26, wherein said method further includes the steps of:

building a program, said step of automatically presenting includes a step of presenting said program, said program includes said speech from said groups of files, said step of presenting said program includes displaying a map of roads, said map includes one or more incident markers, said step of presenting said program further includes playing said speech from said group of files while said map is displayed.

28. A processor readable storage medium according to claim 26, wherein:

said second audio file is a less precise audio description for said first value than said first audio file.

29. A processor readable storage medium according to claim 26, wherein said method further includes the step of:

storing references for said groups of files, said step of presenting reads said references, said step of presenting includes concatenating said groups of files to form an output file, said step of presenting includes playing said output file.

30. A processor readable storage medium according to claim 26, wherein:

said step of automatically presenting includes playing said stored speech in a complete sentence like manner.

31. A processor readable storage medium having processor readable code embodied on said processor readable storage medium, said processor readable code for programming a processor to perform a method comprising the steps of:

receiving data for a set of traffic incidents, said received data including first data for a first traffic incident, said first data includes parameters for said first traffic incident, at least one of said parameters include at least one code representing a value for said parameter;

identifying, based on said first data, a first group of audio files that describe said first incident, said first group of audio files include speech, said step of identifying includes the step of identifying, for each parameter of at least a subset of said parameters, one or more files that store speech using a set of information correlating codes for said parameter to references to audio files; and presenting said speech from said first group of audio files in a complete sentence like manner.

32. A processor readable storage medium according to claim 31, wherein:

said first data includes a first code for a first data value;

said step of identifying a first group of audio files includes identifying a first file storing speech which exactly identifies said first data value, if said set of information directly correlates said first code to said first file; and said step of identifying a first group of files includes identifying a second file storing speech which identifies a less precise audio description of said first data value if said set of information does not directly correlate said first code to said first file.

33. A processor readable storage medium according to claim 26, wherein said method further includes the steps of:

building a program, said step of automatically presenting includes a step of presenting said program, said program includes said speech from said first group of files, said step of presenting said program includes displaying a video of a map of roads, said map includes one or more incident markers, said step of presenting said program further includes playing said speech from said group of files while said map is displayed.

34. A processor readable storage medium according to claim 31, wherein:

said files in a particular group include speech for filler phrases.

35. A processor readable storage medium according to claim 31, wherein said method further includes the steps of:

storing references for said files in said first group, said step of presenting reads said references, said step of presenting includes concatenating said files for said first group to form an output file, said step of presenting includes playing said output file.

36. A processor readable storage medium according to claim 31, wherein said method further includes the steps of:

creating an audio program file which includes references to said first group of audio files, said step of presenting includes the steps of reading said references in said audio program file and playing said speech from said first group of audio files.

37. An apparatus for reporting traffic information using pre-recorded audio, comprising:

a display;

an input device;

a storage unit; and a processor in communication with said storage unit, said input device and said display, said storage unit storing code for programming said processor to perform a method comprising the steps of:

receiving data for a set of traffic incidents, said data including parameters for said traffic incidents, one or more of said parameters include codes representing a value for said parameter, identifying groups of files that store speech for describing said incidents, each group of files is associated with at least one of said incidents, said groups of files vary in number of files per group depending on how many parameters are associated with a particular incident and how many audio files are needed to describe parameters associated with said particular incident, said step of identifying groups comprises the steps of:

for each incident of at least a subset of said traffic incidents, accessing parameters for said incident, and for each parameter of at least a subset of said accessed parameters, identifying one or more files that store speech using a set of information correlating codes for said parameter to references to audio files, and automatically presenting said stored speech from each group of files.

38. An apparatus according to claim 37, wherein:

said step of automatically presenting includes playing said stored speech in a complete sentence like manner.

39. A method according to claim 1, wherein:

said step of automatically presenting includes presenting an audio/visual program that includes said stored speech, said audio/visual program does not require user interaction during presentation.

40. A method according to claim 1, wherein:

said step of automatically presenting includes continuously presenting an audio/visual program that includes said stored speech.

41. A method according to claim 1, wherein:

said step of automatically presenting includes presenting an audio program that includes said stored speech, said audio program does not require user interaction during presentation.

42. A method according to claim 25, wherein:

said step of automatically presenting includes presenting an audio/visual program that includes said stored speech, said audio/visual program does not require user interaction during presentation.

43. A method according to claim 25, wherein:

said step of automatically presenting includes continuously presenting an audio/visual program that includes said stored speech.

44. A method according to claim 25, wherein:

said step of automatically presenting includes presenting an audio program that includes said stored speech, said audio program does not require user interaction during presentation.

45. A method according to claim 37, wherein:

said step of automatically presenting includes presenting an audio/visual program that includes said stored speech, said audio/visual program does not require user interaction during presentation.

46. A method according to claim 37, wherein:

said step of automatically presenting includes continuously presenting an audio/visual program that includes said stored speech.

47. A method according to claim 37, wherein:

said step of automatically presenting includes presenting an audio program that includes said stored speech, said audio program does not require user interaction during presentation.

48. A method for reporting traffic information using pre-recorded audio, comprising the steps of:

receiving data for a set of traffic incidents, said data including parameters for each of said traffic incidents, one of said parameters has a first data value;

identifying groups of files that store speech for describing said traffic incidents, each group corresponds to one of said incidents, each group has a quantity of files that depends on how many parameters are associated with said corresponding incident and how many audio files are needed to describe said parameters associated with said corresponding incident, said step of identifying groups of files includes the steps of:

accessing a set of information correlating values for said parameters to references to audio files, identifying a first file storing speech which exactly identifies information represented by said first data value, if said set of information directly correlates said first data value to said first file, identifying a second file storing speech and a third file storing speech if said set of information correlates said first data value to said second file and said third file, and identifying a fourth file storing speech which is a less precise audio description for said information represented said first data value, if said set of information does not correlate said first data value to any audio files; and automatically presenting said stored speech from each group of files.

* * * * *